United States Patent [19]

Egeröd

[11] Patent Number: 4,677,297
[45] Date of Patent: Jun. 30, 1987

[54] APPARATUS FOR OBTAINING AN ENLARGED IMAGE OF A PORTION OF THE FIELD OF VIEW OF AN INFRA-RED CAMERA

[75] Inventor: Eskel Egeröd, Mölndal, Sweden

[73] Assignee: Telefonaktiebolaget LM Ericsson, Stockholm, Sweden

[21] Appl. No.: 777,166

[22] Filed: Sep. 18, 1985

[30] Foreign Application Priority Data

Sep. 18, 1984 [SE] Sweden .............................. 8404672

[51] Int. Cl.$^4$ .................................................. G02B 26/10
[52] U.S. Cl. ...................................... 250/334; 250/332
[58] Field of Search ....................... 250/334, 332, 330; 358/113

[56] References Cited

U.S. PATENT DOCUMENTS

| | | | |
|---|---|---|---|
| 3,886,359 | 5/1975 | Cheek, Jr. et al. | 250/334 |
| 4,262,199 | 4/1981 | Bridges et al. | 250/348 |
| 4,264,929 | 4/1981 | Pusch | 358/199 |

FOREIGN PATENT DOCUMENTS

| | | | |
|---|---|---|---|
| 119227 | 7/1984 | Japan | 250/334 |
| 2152328 | 7/1985 | United Kingdom | 358/113 |

Primary Examiner—Janice A. Howell
Assistant Examiner—Constantine Hannaher
Attorney, Agent, or Firm—Roberts, Spiecens & Cohen

[57] ABSTRACT

The invention relates to an apparatus for obtaining an enlarged image of a part of the field of view of an IR camera. A device (4,6) for horizontal deflection and a device (5,17) for vertical deflection deflect IR rays (7) incident on the camera towards detector elements (8). These sense the field of view along parallel scanning lines costituting bands, and generate video signals so that the lines can be presented on a display screen (3). In accordance with the invention the device (5,17) for vertical deflection forms a smaller portion in height of the field of view than normal height thereof. The bands partially overlap each other so that the scanning lines in one band fall in the space between scanning lines in a preceding band. The bands are individually noted in the reading order in separate memory (C, D, E). The data for the lines falling in the space will be noted at addresses which do not correspond to their true position in the field of view. This is corrected by a readout device (31,32) which adjusts the readout to the image screen (3) such that the readout alternates between respective memory parts in the sequential order of the image lines.

3 Claims, 13 Drawing Figures

APPARATUS FOR OBTAINING AN ENLARGED IMAGE OF A PORTION OF THE FIELD OF VIEW OF AN INFRA-RED CAMERA

FIELD OF INVENTION

The invention relates to an apparatus for obtaining an enlarged image of a portion of the field of view of an infra-red (IR) camera, which has a beam deflection device controlled vertically and horizontally for deflecting in these directions IR radiation incident on the camera, this radiation being deflected towards mutually spaced detector elements arranged in a row for thus scanning the field of view along parallel, mutually spaced and approximately horizontal lines such as to generate a video signal corresponding to each of the lines, so that the lines may be presented on a display screen, a plurality of said approximately horizontal lines corresponding to the plurality of detector elements thus forming a band, and a plurality of bands together form an image on the display screen corresponding to the field of view.

BACKGROUND

With IR cameras it is often desirable to present an enlarged partial image of the camera's normal field view on a display screen. In such cases it is known to provide the IR camera with an object lens having a variable magnification and image field, e.g. a double lens or zoom lens. Such object lenses give improved resolution in the partial image, i.e. this image has a greater degree of detail than the normal image. These object lenses are complicated, however, and it is difficult to meet heavy demands on exactness of the object lens sighting line, which has importance, e.g. in aiming for firing purposes. A fixed object lens is therefore often used in IR cameras in order to obtain sufficient accuracy in a simple manner. An enlarged partial image can thus be obtained conventionally by the video signal for a line in the field of view from one of the IR camera detector elements being presented on two mutually adjacent lines on the display screen. To a certain extent this makes it easier for the operator to identify an object, but the partial image has the same resolution as the normal image. It is also known to present a partial image in which each line on the display screen contains superimposed information from several scans of a line in the IR camera's field of view. The signal-to-noise relationship in the picture is thus improved, i.e. the noise interference in the partial image, coming from such as the electronic circuits in the camera will be less noticeable than in the normal image. Scanning the field of view takes a long time, however, and the resolution in the partial image is not improved. In order to obtain improved resolution in an IR camera it has been proposed to provide the detector with an increased number of detector elements. The detector is so complicated and expensive that this is hardly economically possible, however.

SUMMARY OF THE INVENTION

In accordance with the invention the above-mentioned difficulties are avoided by scanning the field of view over surfaces which are partially mutually overlapping, so that an enlarged partial image with high resolution is obtained.

More particularly, the invention contemplates apparatus for obtaining an enlarged image of a portion of the field of view of an infra-red (IR) camera, which has a beam deflection device controlled vertically and horizontally for deflecting IR radiation incident on the camera, the radiation being deflected towards mutually spaced detector elements arranged in a row for thus scanning the field of view along parallel, mutually spaced and approximately horizontal lines such as to generate a video signal corresponding to each of the lines, so that the lines may be presented on a display screen. A plurality of the horizontal lines correspond to the plurality of detector elements thus forming a band, and a plurality of bands together form an image on the display screen corresponding to the field of view. A means for vertical deflection achieves a deflection so that the bands partially overlap each other, the scanning lines in one or more bands falling in the space between scanning lines in a preceeding band, and in accordance with the invention the deflection takes place such that a smaller part in height than its normal height of the field of view is depicted; the deflection device utilizes a memory means where the image lines in a band and subsequent bands are noted individually in separate memory parts in order of reading so that data for the lines falling in the space will be noted at addresses which do not correspond to their true position in the field of view, and for correcting this a readout means provides for the readout to the image screen such that the readout alternates between respective memory parts in the correct sequential order of the image lines.

BRIEF DESCRIPTION OF DRAWINGS

The invention will now be described in detail with reference to the drawing, wherein FIG. 1 schematically illustrates an IR camera for scanning a field of view on a display screen.

DETAILED DESCRIPTION OF A BEST MODE FOR CARRYING OUT THE INVENTION

Figure 1:
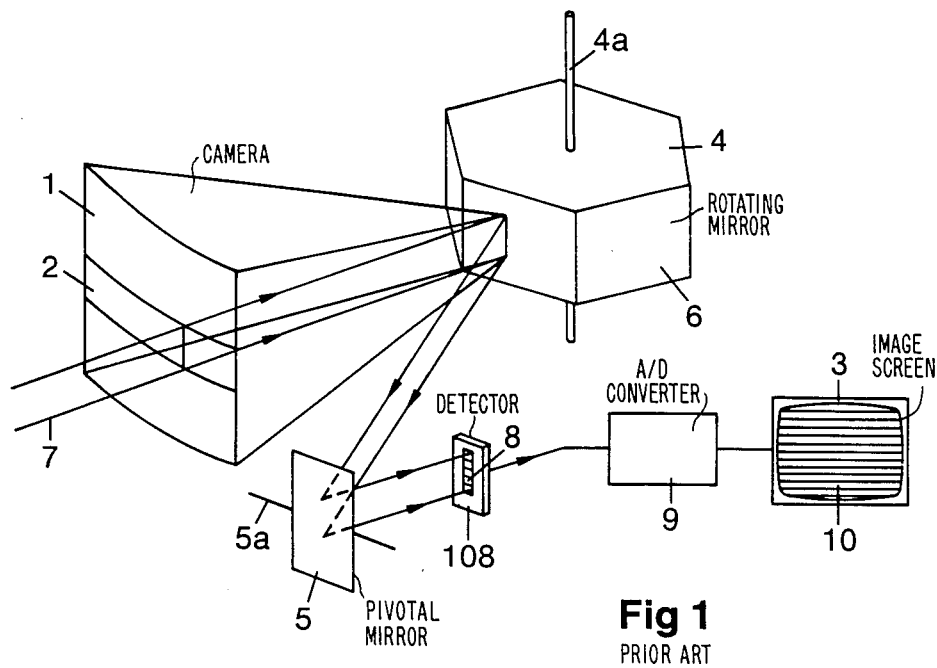
Figure 2:
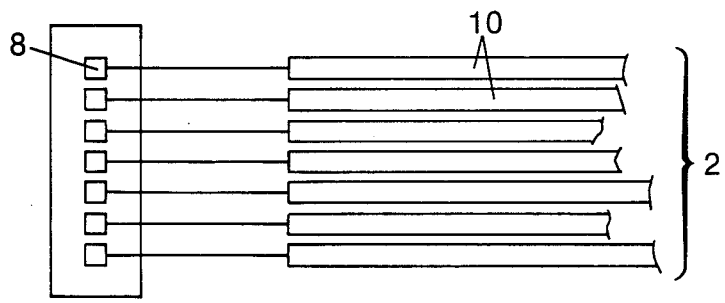
FIG. 2 illustrates the IR camera detector elements and corresponding scanned lines, which comprise a band in the field of view.

FIG. 1 schematically illustrates a known IR camera 1, which scans a field of view for presentation of the scanned image on an image screen 3. The camera has a beam deflection device with a rotating polygon mirror 4 scanning the field of view in substantially horizontal bands 2, and a pivoting flat mirror 5 for vertically scanning the successive bands 2 in the field of view. The polygon mirror is a parallelepiped, the base surface of which is a regular polygon, and the sides of which are provided with mirrors 6. The beam deflection device 4, 5 deflects the IR rays 7 incident on the camera towards a detector 108 having IR-sensitive detector elements 8. These are connected to a signal processing unit 9, where the analog signals from the detector elements are digitalized and stored in the memory for reading out in a desired order on the image screen 3, as will be described below. The detector elements are illustrated in FIG. 2, these being seven in number in the present IR camera, and are placed in a row above one another at a mutual small spacing.

Figure 3:
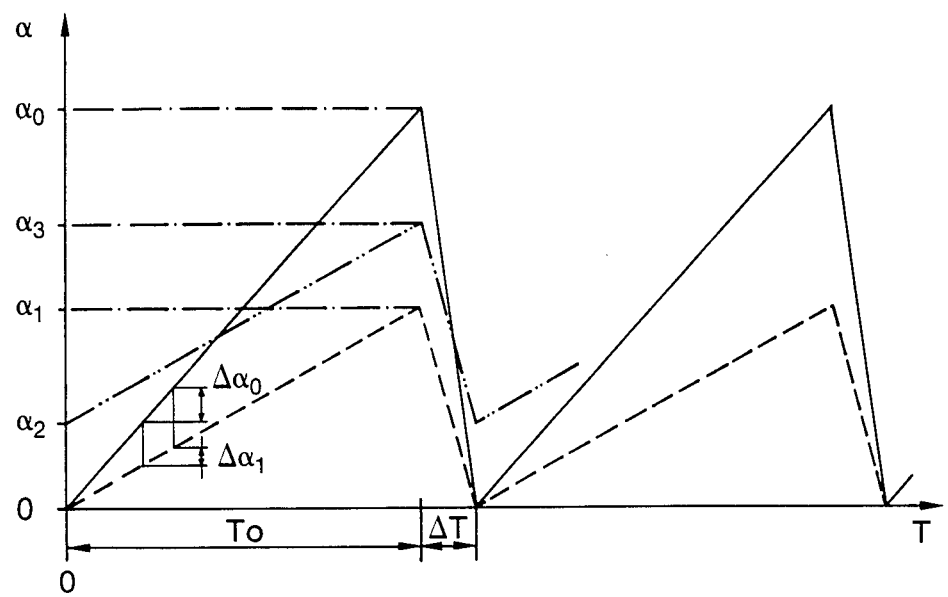
FIG. 3 is a diagram of the movement of a mirror for vertical deflection of IR radiation incident on the camera.
Figure 4A:
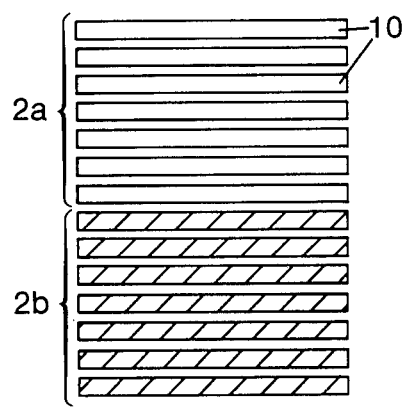
FIG. 4a illustrates the position of the scanned bands in the field of view in a conventional IR camera.

For a horizontal sweep of one of the mirrors 6 the detector elements each scan a line 10 in the field of view and the lines together form a band 2. The field of view is scanned vertically by the mirror 5 executing a movement about its axis 5a according to the saw-tooth curve drawn in full lines in FIG. 3. Here, the time is denoted by T and $\alpha$ denotes the turning angle of the mirror. The entire height of the field of view is scanned during an interval $T_0$, during which the mirror 5 pivots from its initial position at the angle 0 to its final position at an angle $\alpha_0$. The polygon mirror in FIG. 4 rotates about its axis 4a, and the movements of the mirrors are synchronized such that two of the scanned bands 2a and 2b in the field of view are conventionally adjacent each other, as illustrated in FIG. 4a. As will be seen from FIG. 3, the mirror moves at a constant angular velocity during the time interval $T_0$. During the time the polygon mirror 4 scans a band 2 in the field of view 1, the mirror 5 thus turns a small angle $\Delta\alpha_0$, corresponding to the width of the band 2, i.e. the width of seven lines 10 and seven areas in the field of view 1 lying between the lines. This small angular turn results in that the scanned bands 2 in the field of view have a slight inclination, which is neglected in the figures. When the entire field of view has been scanned in this way, the mirror 5 is returned to its initial position during an interval $\Delta T$ so that the field of view can be scanned once again.

Figure 5:
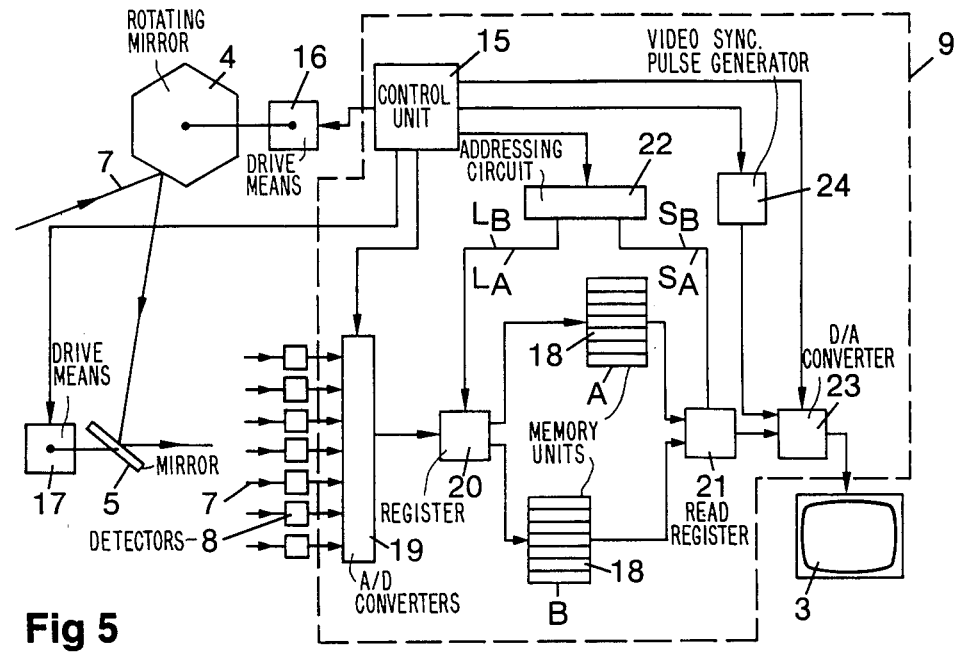
FIG. 5 is a block diagram of the conventional IR camera with its signal processing unit.

Synchronization between the polygon mirror 4 and the pivoting mirror 5 is achieved by the means according to FIG. 5. This Figure is a block diagram of the known IR camera illustrated in FIG. 1, and shows the signal processing unit 9 thereof in detail. A control unit 15 sends control signals to a drive means 16 for the polygon mirror 4, and also to a drive means 17 for the pivoting mirror 5, so that the mirrors deflect the IR rays 7 towards the detector elements 8 in the manner described above.

Figure 8A:
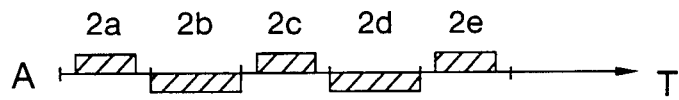
FIG. 8a illustrates read and readout intervals for the memory units of the conventional IR camera.

In order to present the scanned field of view on the image screen 3, the signal processing unit 9 has two memory units A and B, where reading and readout of the video signals takes place alternatingly. Signals are sent from the detector elements 8 via analog digital converters, together denoted by 19, and via a register 20 to the inputs of the memory units A and B. The outputs of the latter are connected to the image screen 3 via a read register 21 and a digital-analog converter 23. The detector elements 8 send parallel video signals, corresponding to the band 2a in FIG. 4a, to the analog-digital converters 19. On obtaining signals from the control unit 15 these converters 19 sample the video signals at a plurality of points corresponding to the desired resolution of a line in the image on the display screen 3, e.g. 800 points. The analog-digital converters 19 convert the video signals at these points to digital words for defining the light strength of the incoming IR radiation. The alternating read and readout of the memory units A and B is schematically illustrated in FIG. 8a, where T denotes the time. The sectioned rectangles above the time axes denote read intervals, for the two memory units A and B, and the rectangles under the time axes denote readout intervals for the units. Reading into the memory units from the detector elements is in parallel, and readout to the image screen is in series form in the following manner: The converters 19 feed the digital video signals to the register 20, which, on obtaining a signal $L_A$ from an addressing circuit 22 feeds the signals to the memory A, which stores them in its memory cells 18 in the order of sequence of the image lines. When a signal $S_A$ is fed from the addressing circuit to the read register 21, the memory A sends the video signals in series form via the register to the digital-analog converter 23. On obtaining a signal from the control unit 15, a video sync pulse generator 24 feeds synchronizing pulses to the image screen 3 via the digital-analog converter 23. During readout of the memory A, the register 20 obtains a control signal $L_B$ from the addressing circuit 22. In this way the analog-digital converters 19 feed the video signals from a new band 2b to the memory B. When a signal $S_B$ is sent from the addressing circuit 22 to the read register 21, this memory B sends the video signals to the display screen 3. When the signal $L_A$ is fed to the register 20, the memory A obtains signals from the analog-digital conveters 19 once again. The addressing circuit 21, analog-digital converters 19 and digital-analog converters 23 obtain timed control signals from the control unit 15 so that that the signal processing is synchronized with the image scanning. In turn, the scanning frequency is determined by the line frequency of the display screen 3, and is selected such that the presented image is apprehended as stable by the eye.

Figure 4B:
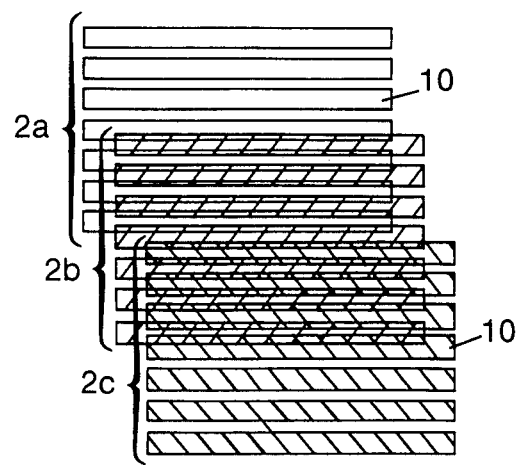
FIG. 4b illustrates the position of the bands in the IR camera.
Figure 6:
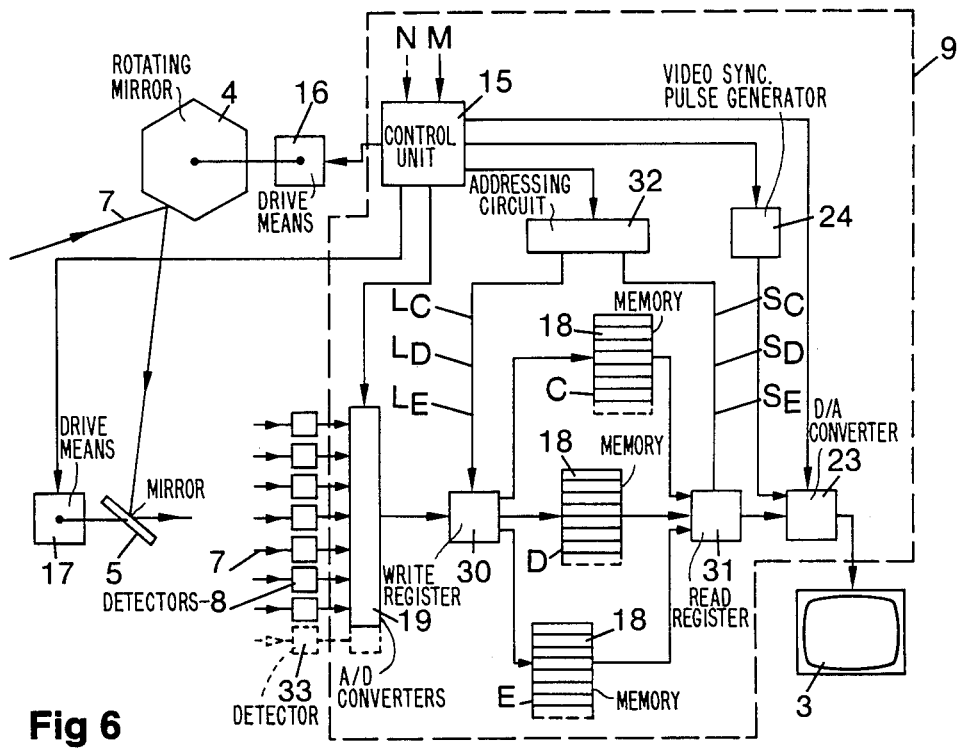
FIG. 6 is a block diagram of an IR camera modified in accordance with the invention.
Figure 7A:
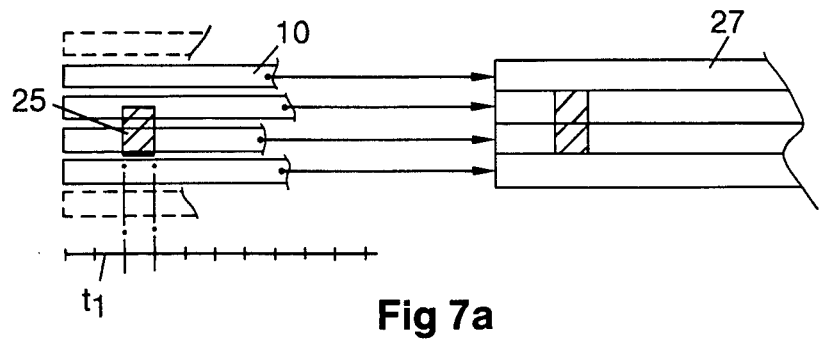
FIG. 7a illustrates the presentation on a display screen of an IR-radiating object in the field of view in the conventional IR camera.
Figure 7B:
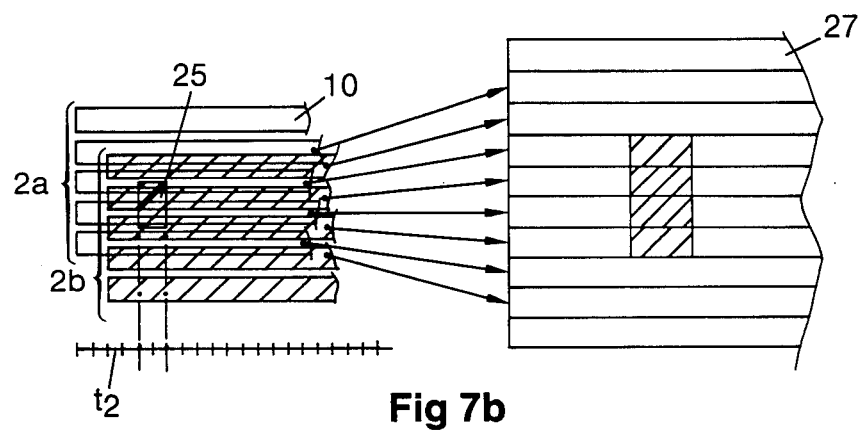
FIG. 7b illustrates the presentation of the IR-radiating object by the IR camera of the invention.
Figure 8B:
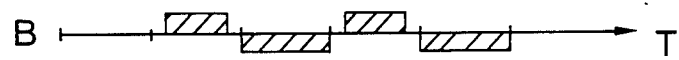
FIG. 8b illustrates read and readout intervals for the IR camera of the invention, and FIG. 9 schematically illustrates the readout device for the memory cells in the memory units of the IR camera of the invention.

FIG. 6 illustrates an IR camera modified in accordance with the invention, for obtaining an enlarged image of a portion of the field of view 1 on the image screen 3. Scanning the lines 10 in the field of view 1 with the aid of the polygon mirror 4 (FIG. 1) takes place with the same frequency as for the normal image. The control unit 15 sends unaltered signals to the drive means 16 of the polygon mirror 4, so that the mirror rotates with the same rotational velocity as for the normal image. However, vertical scanning with the mirror 5 takes place so that consecutive bands 2a, 2b in the field of view 1 overlap each other, as illustrated in FIG. 4b. The bands in this figure are mutually, somewhat laterally displaced to increase the clarity of the figure. During the time the polygon mirror 4 makes a horizontal sweep of one of the bands 2, the mirror 5 turns a small angle $\Delta\alpha$, according to FIG. 3, approximately corresponding to the width of four of the lines 10 and three of the areas in the field of view 1 lying between the lines, according to FIG. 4b. In the IR camera of the invention, this angular turn is: $\Delta\alpha_1 = 7/14 \Delta\alpha_0$, where $\Delta\alpha_0$ is defined above in connection with FIG. 3. The angular movement $\alpha_1$ of the mirror 5 for an entire image sweep during the time interval $T_0$ corresponds, according to FIG. 3, to the angle $\Delta\alpha_1$, so that $\alpha_1 = 7/14\alpha_o$. Thus only half the height of the field of view 1 is scanned with the IR camera of the invention. The changed vertical scanning is achieved by an operator sending a signal M to the control unit 15 as in FIG. 6. In turn, this unit sends signals to the drive means 17 of the mirror 5 so that this mirror moves through the angle $\alpha_1$ during the time interval $T_0$. This half-height portion of the field of view scanned in this way is presented over the entire height of the display screen 3, as illustrated by the arrows in FIG. 7b, by each of the lines 10 being presented with its individual image line 27 on the screen. An enlargement by a factor 2 is thus obtained in the vertical direction. To obtain the same magnification horizontally, the sampling frequency of the analog-digital converters 19 is doubled in relation to the frequency of the normal image. This is done by the control unit 15, in FIG. 6, actuating the analog-digital converters on receiving the signal M from the operator. When the polygon mirror 4 scans the bands 2 at an unchanged rotational velocity, and the number of image points is unaltered at 800, the doubled sampling frequency results in that only half the length of the scanned line 10 is registered. FIG. 7a illustrated how a small rectangular IR-radiating object 25 in the field of view 1 is presented on the display screen 3 for the normal image. The lines 10 in the field of view are sampled during the interval $t_1$ and presented on the image lines 27 on the display screen. FIG. 7b illustrates how the object 25 is presented in the enlarged partial image. The field of view 1 is scanned by the mutually overlapping bands 2a and 2b, the lines in one band being in the spaces between the lines in the other band. The lines are sampled with the interval $t_2\frac{1}{2}t_1$ are presented on the lines 27 on the image screen. The object is registered by the detector elements 8 for four different lines in the field of view, two in the band 2a and two in the band 2b, and the signals from the detector elements are sampled twice per line 10 in the field of view during the time that the object 25 is scanned. As will also be seen from FIG. 7b, the lines 10 in the field of view are not scanned in the order they are presented on the display screen. the detector elements 8 first register the lines 10 in the band 2a and thereafter the lines 10 in the band 2b. The image lines 27 on the display screen 3 must be presented with the same mutual positional relationship as those in the field of view 1, however, for the object 25 to be correctly depicted. Correction of the order of presentation of the lines 10 must therefore take place, as illustrated by the arrows. The signal processing unit 9 of the invention, illustrated in FIG. 6, has a memory means with three memory units C, D and E for this purpose. Reading and readout in these memory units takes place alternatingly in the manner schematically illustrated in FIG. 8b. With T denoting the time, the sectioned rectangles above the time axes denote read intervals for the three memory units C, D and E and the rectangles below the time axes denote readout intervals for the memory units. The bands scanned in the field of view 1 are denoted by 2a-2e.

The memory means operates in the following manner. During the first interval the band 2a is read into the memory unit C and in the next interval the band 2b is read into the memory unit D. During the following interval the band 2c is read into the memory unit E and the units C and D are read out alternatingly to the display screen in a manner which will be explained in detail hereinafter. During the next consecutive interval the band 2d is read into the memory unit C, which is entirely emptied at the readout. Alternatingly readout of the memory units D and E takes place simultaneously, the memory unit D then being emptied completely. In the next consecutive interval the band 2e is read into the memory unit D and readout takes place alternatingly between the memory units C and E. This cycle is repeated until the entire partial image in the field of view has been scanned and presented on the display screen 3.

Figure 9:
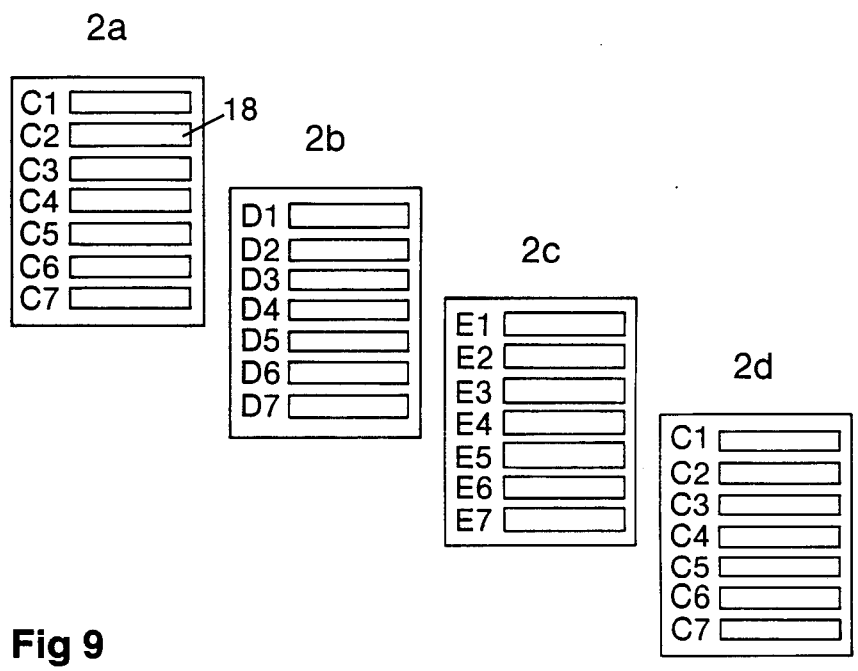

The alternating readout will now be explained in connection with FIG. 9. The memory units C, D and E have memory cells numbered from 1 to 7 within each memory unit. The bands read into the memory units are denoted by 2a-2d. The memory cells are placed, for the sake of clarity in the figure, so that each memory cell has a position in height corresponding to the position of its respective line 10 in the field of view 1 according to FIG. 4b. The bands 2a and 2b are read into the memory units C and D, as described above. Readout of the memory cells takes place in the order: C1, C2, C3, C4 D1, C5, D2, D6, D3, C7, D4. The band 2c is read into the memory unit E during this readout. The readout can therefore continue without interruption in the order E1, D5, E2, D6, E3, D7, E4, during which the band 2d is read into the memory unit C, which isemptied. Readout of the memory cells can continue in the order C1, E5, C2, E6, C3, E7, C4 and the cycle repeated, as mentioned above, until the entire partial image has been scanned by the camera and presented on the display screen.

The three memory units C, D and E are controlled by the signal processing unit 9 in FIG. 6. On changing over from the normal image to the enlarged partial image, the operator sends the signal M, so that the amplitude of the mirror 5 and the sampling rate for the analog-digital converters 19 is changed, as previously described. When the signal M is sent, switches, unillustrated in the figure, are reset so that the memory units A and B with their registers 20 and 21 and the addressing circuit 22 according to FIG. 5 are disconnected, and the memory units C, D and E, a write register 30, a read register 31 and an addressing circuit 32 are switched in. After switching, the inputs of the memory units are connected to the outputs of the analog-digital converters via the register 30, and the outputs of the latter are connected to the display screen 3 via the read circuit 31 and digital-analog converter 23. The analog-digital converters send the video signals for one of the bands 2 from the detector elements to the register 30, which for a signal $L_C$ from the address register 32 sends the video signals to the memory unit C for storage as described above. The video signals from the next consecutive band are stored for a signal $L_D$ in a corresponding way in the memory unit D. For signals $S_C$ and $S_D$ from the address register 32 to the read register 31 there is a readout of the video signals from the memory units C and D, as described above. The readout video signals are converted in the digital-analog converter 23 and transferred together with synchronizing pulses to the display screen 3 in the same way as for the normal image. On receiving a signal $L_E$ from the addressing circuit 32, the register 30 feeds video signals to the memory unit E during the readout of the memory units C and D. When the memory unit C is emptied, the memory units D and E are read out to the display screen 3 for signals, $S_D$ and $S_E$ from the addressing circuit, as explained in conjunction with FIG. 9. In the IR camera described above, the signal processing unit 9 has a memory means, including the memory units A and B with their registers, for the normal image, and a memory means including the memory units C, D and E with their registers, for the enlarged partial image. However, an IR camera in accordance with the invention may have a signal processing unit only including three memory units with registers, which are utilized for both the normal image and the enlarged partial image.

Figure 4C:
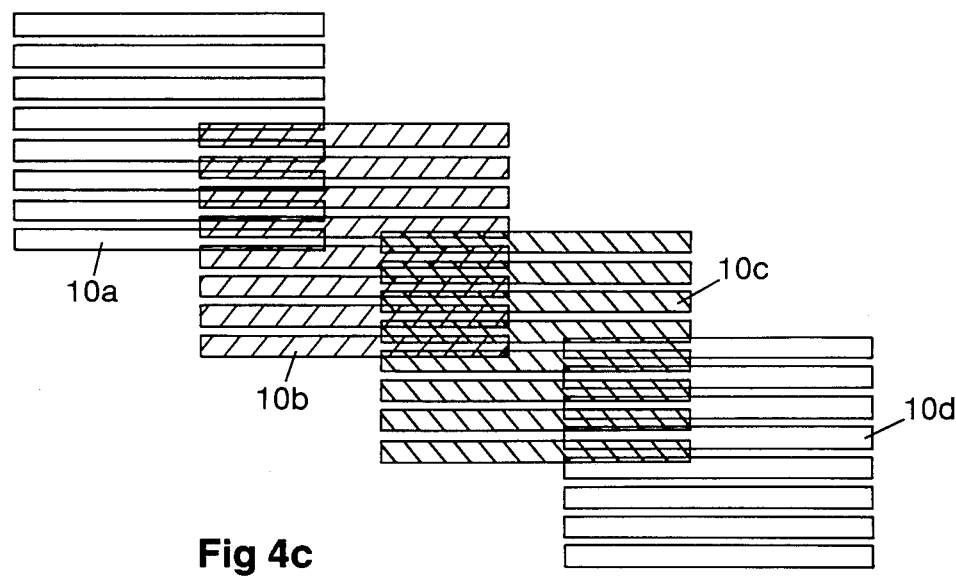
FIG. 4c illustrates the position of the bands in the camera of the invention where the lines in different bands in the field of view coincide.

The IR camera of the embodiment above has an odd number of detector elements 8,—seven in number. The position of the bands 2 in the field of view 1 for the magnified partial image from this IR camera is illustrated in FIG. 4b. An inventive IR camera with an even number of detector elements differs in certain respects from the described IR camera, and this will be described below for such an embodiment. In FIG. 4c the position of the bands in the field of view is illustrated for the enlarged partial image coming from an IR camera with eight detector elements. The bands in the figure are heavily laterally displaced for the sake of clarity. The last line 10a in the first band covers the same area in the field view 1 as the first line 10c in the third band, and the last line 10b in the second band covers the same area as the first line 10d in the fourth band. It is desirable that these lines are presented on the image screen with approximately the same intensity as the remaining lines, which requires that the video signal from only one of two mutually covering lines in the field of view is presented on a line 27 on the display screen. The block diagram for an IR camera with eight detector elements is indicated in FIG. 6 by supplementation with dashed lines. These show the eighth detector element 33 and corresponding analog-digital converter portion 19, as well as the further memory cells 18 in the memory units C, D and E. The addressing circuit corresponding to the addressing circuit 32, is so arranged in this IR camera that for the magnified partial image the video signal from the first line in each band is suppressed on reading into the respective memory unit, and the first memory cell 18 in every memory unit is jumped over for reading out to the display screen 3. This results in that during the time eight of the lines 10 are scanned in the field of view 1, only seven lines can be presented on the display screen 3. The image screen in the present embodiment is however adapted such that the frequency with which the lines are presented will be unaltered at the changeover from the normal image to the enlarged partial image. The frequency with which the bands 2 in the field of view 1 are scanned must therefore be increased correspondingly at the changeover to the enlarged partial image. In the IR camera of the embodiment above, with eight detector elements, this frequency must be increased to 8/7 of the frequency for the normal image where the enlarged partial image is being shown. This is achieved by the control unit 15 in FIG. 6 sending a control signal to the drive means 16 of the rotating polygon mirror 4 on receiving a signal N from the operator. The rotational velocity of the polygon mirror is then increased to 8/7 of the rotational velocity for the normal image. The frequency with which the pivoting mirror 5 moves is kept unaltered during the changeover to the enlarged partial image. Thus the field of view 1 is scanned in the same way as for the normal image, during the time interval $T_0$, which is determined by the image frequency of the display screen 3. The amplitude of the pivoting mirror movement is reduced for the changeover to the enlarged partial image to 7/16 of the amplitude for the normal image, whereby the bands in the field of view are scanned as illustrated in 4c. This is achieved by the control unit 15 sending a signal to the drive means 17 of the mirror 5 on obtaining the signal N from the operator. The signal processing of the video signals obtained from the detector elements 8 and 33 takes place in the following manner: For the signal from the control unit 15 to the analog-digital converters 19, the sampling frequency is increased to $8/7 \times 2$ of the sampling frequency for the normal image. The sampling frequency thus corresponds to the increased scanning frequency of the bands 2, and the presented image is given a correct height/width relationship as previously described in conjunction with FIG. 7b. The digital video signals are stored in the memory units C, D and E, for signals from the addressing circuit at a rate corresponding to the increased scanning frequency. The signal from the first detector element in each band is thus suppressed, as mentioned above. Readout of the memory cells in the memory units take place for signals from the addressing circuit and at the same frequency as for the normal image, the first memory call in each memory unit then being jumped over.

In the IR camera with an even number of detector elements described above, the frequency with which the bands 2 are scanned is increased on changing over to the enlarged partial image. It is of course also possible to keep the scanning frequency for the bands constant in this IR camera, and instead to adjust the image screen 3 for the reduced readout frequency for the lines occurring at the changeover to the enlarged partial image.

The position of the enlarged partial image in the normal image state of the normal display may be selected by the operator in accordance with the invention in the following manner: Scanning vertically of the field of view 1 by the pivoting mirror 5 has been described in conjunction with FIG. 3. The mirror movement illustrated in this figure between the angles 0 and $\alpha_1$, is scanned for the upper half of the field of view 1, so that the magnified partial image on the display screen is in the upper half of the normal image. It is possible to affect the movement of the miror so that the enlarged partial image is displaced to a desired vertical position in the normal image. For a signal to the control unit 5 selected by the operator, the unit sends a signal to the drive means 17 for the mirror 5 to move, for example, the angles $\alpha_2$ and $\alpha_3$ illutrated in FIG. 3. The scanned area of the field of view 1 is thus displaced downwards a distance corresponding to the angle $\alpha_2$ and the position of the presented image in the normal image is displaced downwards to a corresponding degree. As mentioned in conjunction with FIG. 7b only half the width of the field of view 1 is registered in the horizontal direction i the enlarged partial image by increasing the sampling rate of the analog-digital converters 19 on changing over from the normal image. The position of the enlarged partial image horizontally in the normal image may be selected by the operator by selecting the time, during scanning the bands 2, at which sampling of the video signals obtained shall begin. After a signal to the control unit 15 by the operator, the unit controls the analog-digital converters such that they begin sampling the video signals at the time desired by the operator.

The IR camera described above has a partial image which is linearly magnified by a factor 2 compared with the normal image. It is possible, in accordance with the invention, to obtain a partial image having a greater magnification and resolution by allowing the bands to overlap each other more closely. In this case scanning is arranged such that scanning lines from several successive bands fall into the space between two mutually adjacent scanning lines in one band. The memory and readout means are modified such that the lines presented on the display obtain the same mutual positions as in the scanned field of view.

It has been assumed in the embodiments of the invention described above that the display screen unit 3 is adapted such that on presentation of an entire image during the time interval $T_0$ video signals are read out to all the image lines of the display screen. A display screen unit used in many applications presents the image in two so called half pictures. For the first half picture in such a case, video signals are read out for alternate lines on the display screen, and for the other half picture video signals are read to the lines missed out in the first half picture. This allows image changeover to take place at a lower frequency than in the display screen unit 3 above, without the image quality deteriorating. It is obvious to one skilled in the art that the inventive IR camera with its signal processing unit can be adapted to a display screen unit in which the image is presented in two half images without departing from the inventive concept.

What is claimed is:

1. Apparatus for obtaining an enlarged image of a portion of the field of view of an infra-red (IR) camera, which has a beam deflection device controlled vertically and horizontally for deflecting in these directions IR radiation incident on the camera, this radiation being deflected towards mutually spaced detector elements arranged in a row for thus scanning the field of view along parallel, mutually spaced and approximately horizontal lines such as to generate a video signal corresponding to each of the lines, so that the lines may be presented on a display screen, a plurality of said approximately horizontal lines corresponding to the plurality of detector elements thus forming a band, and a plurality of bands together forming an image on the display screen corresponding to the field of view, and wherein a means for vertical deflection is adapted to execute a deflection so that the bands partially overlap each other, scanning lines in one or more bands falling in the space between scanning lines in a preceding band, said apparatus comprising means for effecting the deflection such that a smaller part in height than its normal height of the field of view (1) is depicted; including a memory (C,D,E) where the image lines (10) in a band and subsequent bands are noted individually in separate memory parts in the order of reading such that data for the lines falling in the space will be noted at addresses which do not correspond to their true position in the field of view (1), and readout means (31, 32) for correcting the addresses of the lines falling in the spaces to regulate the readout to the image screen (3) such that the readout alternates between respective memory parts in the correct sequential order of the image lines.

2. Apparatus as claimed in claim 1, where the IR camera has an even number of detector elements, said apparatus further comprising means (30, 32) for suppressing the video signals from one of two coincident lines (1) in two different bands in the field of view (1) on reading into the memory means (C,D,E), so that no reading takes place to corresponding memory cells (18) while the readout means (31,32) is adapted such that the empty memory cells are by passed during reading out.

3. Apparatus as claimed in claim 1 comprising a control unit (15) to control the means (5,17) for vertical deflection to obtain a desired height section ($\alpha_2$, $\alpha_3$) of the field of view at which scanning for the enlarged image takes place.

* * * * *